April 19, 1966

C. W. JOHNSON ET AL 3,246,618

BUTTON STITCHING MACHINES

Original Filed April 7, 1960

INVENTORS.
CARL W. JOHNSON
MATHIAS PEDERSEN
BY

ATTORNEY

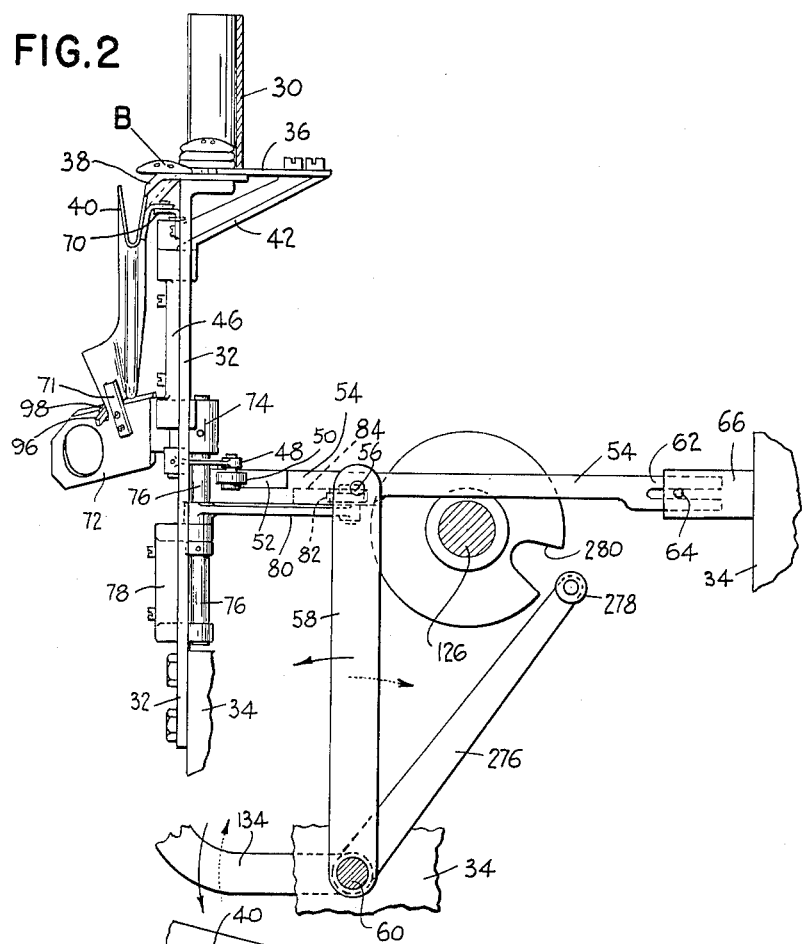
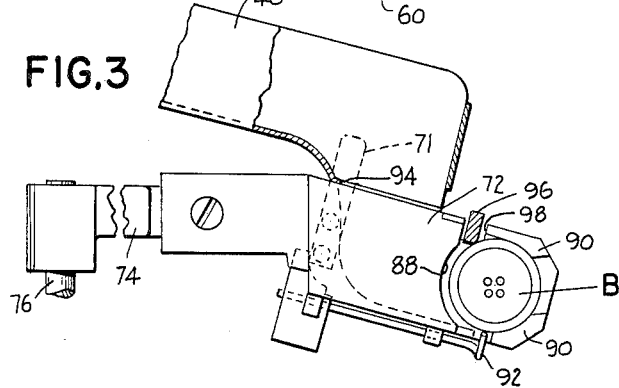

April 19, 1966   C. W. JOHNSON ET AL   3,246,618
BUTTON STITCHING MACHINES
Original Filed April 7, 1960   7 Sheets-Sheet 3

INVENTORS.
CARL W. JOHNSON
MATHIAS PEDERSEN
BY
ATTORNEY

April 19, 1966   C. W. JOHNSON ET AL   3,246,618
BUTTON STITCHING MACHINES
Original Filed April 7, 1960   7 Sheets-Sheet 4

INVENTORS.
CARL W. JOHNSON
MATHIAS PEDERSEN
BY
Wentworth B. Clapham
ATTORNEY

April 19, 1966  C. W. JOHNSON ET AL  3,246,618
BUTTON STITCHING MACHINES
Original Filed April 7, 1960  7 Sheets-Sheet 5
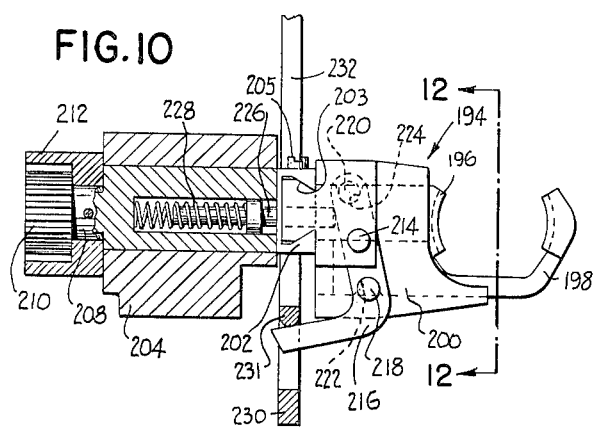
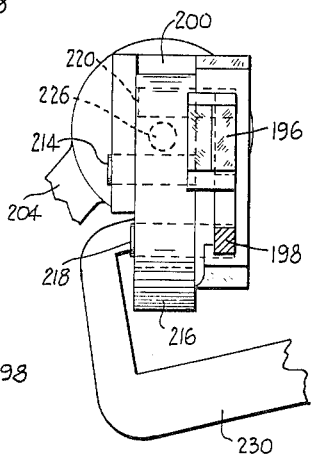
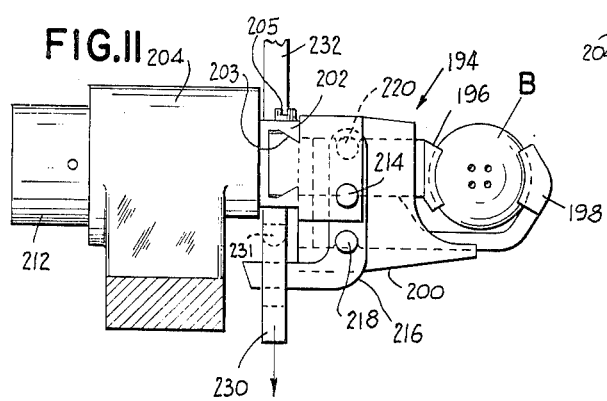
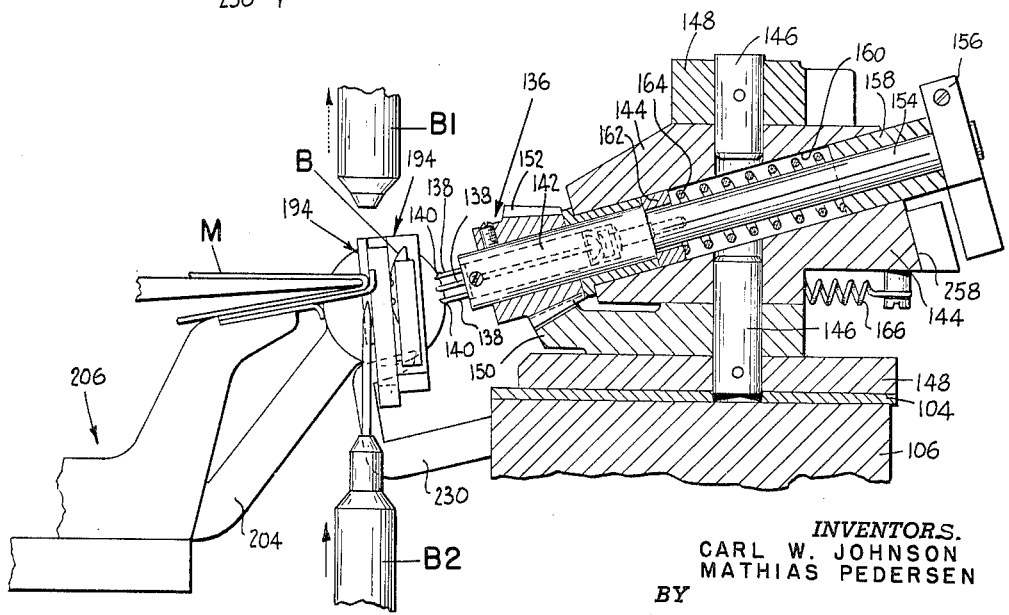
*INVENTORS.*
CARL W. JOHNSON
MATHIAS PEDERSEN
BY
*Wentworth B. Clapham*
ATTORNEY

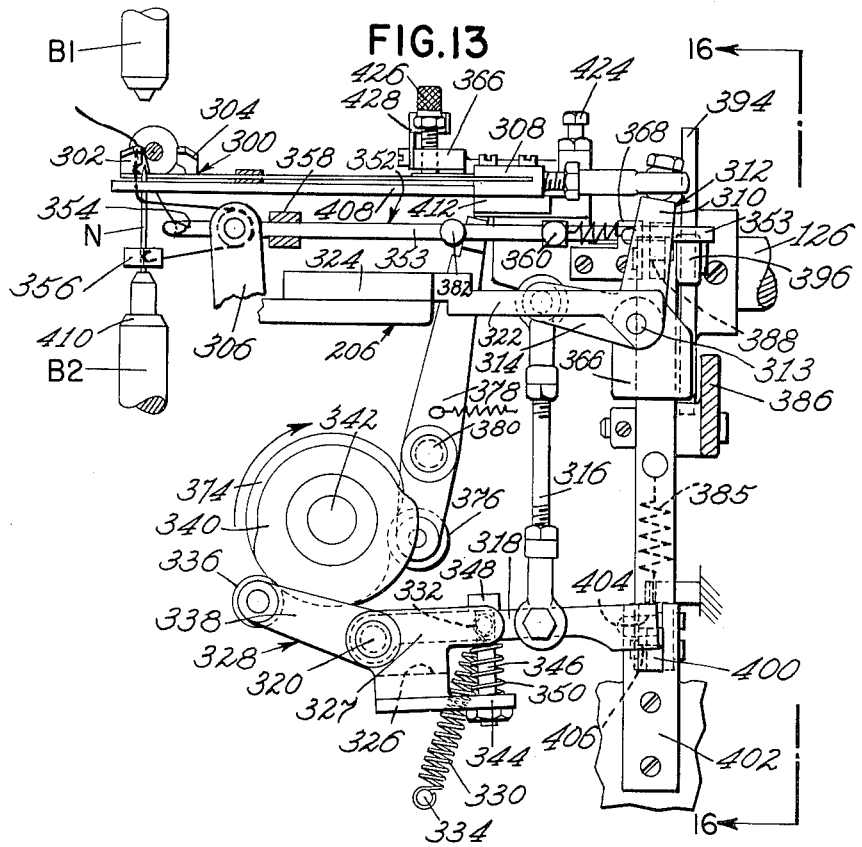
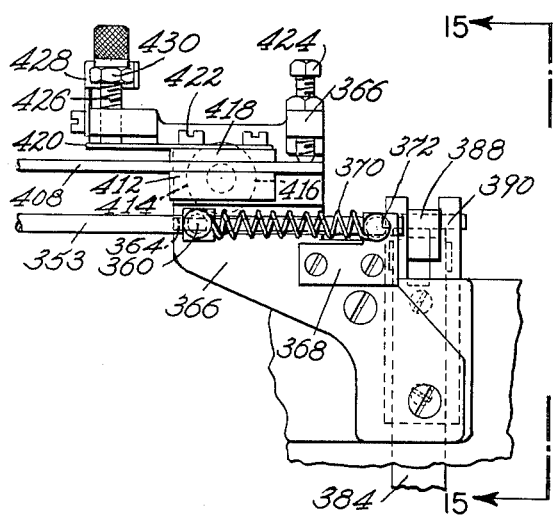
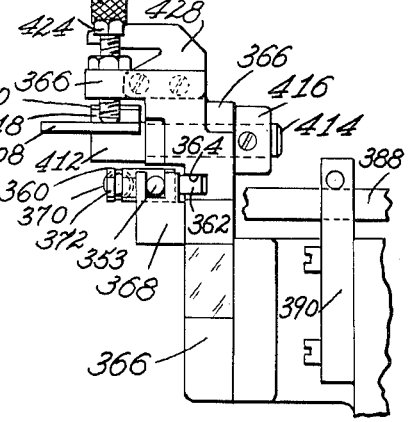

April 19, 1966  C. W. JOHNSON ET AL  3,246,618
BUTTON STITCHING MACHINES
Original Filed April 7, 1960  7 Sheets-Sheet 7
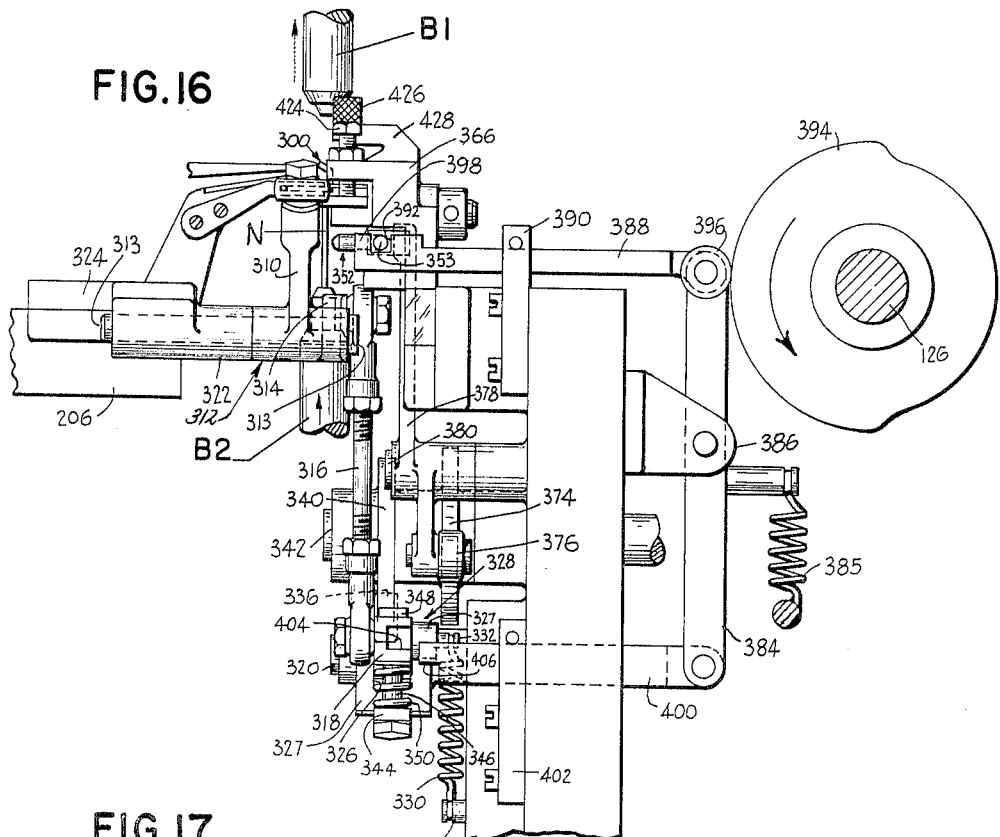
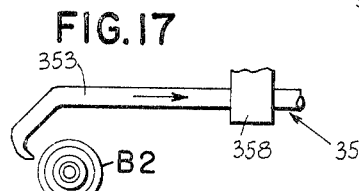
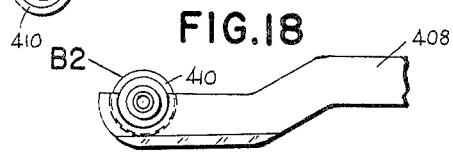
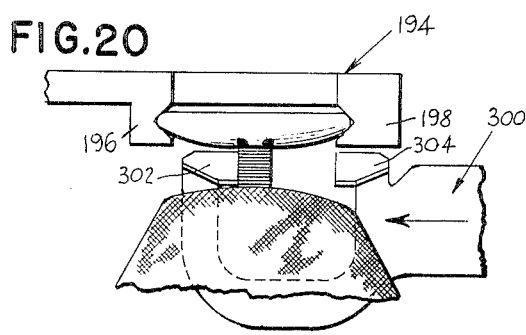
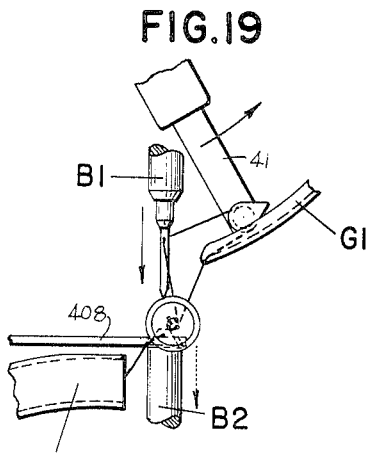
INVENTORS.
CARL W. JOHNSON
MATHIAS PEDERSEN
BY
Wentworth B. Clapham
ATTORNEY United States Patent Office 3,246,618
Patented Apr. 19, 1966

3,246,618
BUTTON STITCHING MACHINES
Carl W. Johnson, Brooklyn, and Mathias Pedersen, Valley Stream, N.Y.; assignors to American Machine & Foundry Company, a corporation of New Jersey
Original application Apr. 7, 1960, Ser. No. 20,693, now Patent No. 3,121,411, dated Feb. 28, 1964. Divided and this application June 20, 1963, Ser. No. 289,327
5 Claims. (Cl. 112—110)

This application is a division of our copending application Serial No. 20,693, now Patent 3,121,411, granted February 28, 1964.

This invention relates to sewing machines, and more particularly to improvements in means for attaching buttons and similar fastening devices to materials, such as men's and women's coats and the like, in a manner closely simulating hand sewing.

In accordance with the invention, there is provided a machine which effects the sewing of buttons in the manner referred to above, and which includes novel mechanism for feeding buttons to a button holding unit or chuck operative in a novel manner to dispose a button relative to the work for attachment thereto. A machine embodying the invention also includes improved means for forming a "post" which supports a button above the work, and thread handling means operative to insure that at all times during the sewing and "post" forming operations the thread is tensioned properly and disposed clear of the path of the needle.

The invention constitutes improvements to button stitching machines of the type disclosed in Patterson et al. Patent 2,739,550, granted March 27, 1956, or in our copending application Serial No. 20,142, filed April 5, 1960, for Button Stitching Machines, now Patent 3,132,613 granted May 12, 1964. This type of machine uses a needle having an eye between its pointed ends. The needle is threaded with a thread having a fixed and a loose end, and in the course of attaching a button, the loose end of the thread is pulled through the button holes and the work and maintained clear of the needle.

As in the machine shown in the Patterson et al. patent, the desirable results of the invention are accomplished by folding the work such as an article of clothing, and locating the folded edge in the path of travel of the needle which is passed back and forth through a button and the folded edge of the work. The plane of the button is located substantially at right angles to the path of travel of the needle, and the button and folded edge of the work are moved alternately, laterally and longitudinally at proper times during the sewing operations in order that the thread may be passed back and forth through selected holes in a button.

At the conclusion of the formation of a plurality of loops attaching the button to the work, the button is swung through 90°, such that the plane of the button lies in a plane parallel to the path of travel of the needle and the work is substantially at right angles relative to the path of the needle so as to locate or position the loops of thread connecting the button to the work in the path of travel of the needle. The button and work are then moved back and forth out of the needle path so that on one stroke, the needle passes on one side of the loops and on its next stroke, it passes on the other side of the loops. This winds or wraps the loops connecting the button to the work and form what is known in the trade as a "post" or "shank." After a suitable number of post forming wraps of thread has been made, the thread is anchored against unwrapping. This can be accomplished by moving the needle through the loops and windings forming the "shank" or through the work at any suitable point where the thread secures the button to the work, the former being preferred. The locking of the thread against unlocking completes the sewing operation.

It is an object of the invention to provide a button stitching machine having novel button feeding and handling mechanism.

It is a further object of the invention to provide novel button feeding and handling mechanism for a button stitching machine wherein buttons are delivered from a source of supply to a button supporting device, and wherein after the first button of a series is fed from the source of supply under manual control, the remaining buttons of the series are delivered automatically to a transfer for injection in the button support.

The invention is further characterized by the provision of novel button supporting mechanism including a chuck having button holding jaws which close upon a button and hold it therein in response to the operation of control means operative on delivery of a button therebetween.

The invention also consists in the provision of novel button handling mechanism including a button chuck having opposed holding jaws which are opened by a manually operated control system, but which close automatically upon delivery of a button between the jaws.

The invention also is characterized by a novel button supplying unit so mounted that relative movement between it and a button injector effects the delivery of a properly oriented button to the injector for delivery in turn to the button chuck.

We have found that it is highly desirable that a button sewing machine be so constructed that the spacing between a button and the work or material to which the button is to be attached be variable in order to take care of buttons and work of different thicknesses. Accordingly it is a further object of our invention to provide a machine wherein it is possible to vary the position of the button chucks relative to the work support so that a predetermined spacing between button and work may be obtained regardless of thickness of button or work.

With these and other objects not specifically mentioned in view, the invention consists in certain combinations and constructions which will be described fully hereinafter, and then set forth in the claims hereunto appended.

In the accompanying drawings which form a part of this specification, and in which like characters of reference indicate the same or like parts:

FIG. 2 is a detailed end elevation of the button feeding mechanism.

FIG. 3 is an enlarged detailed rear view of the button trap in conjunction with the button feeding mechanism.

FIG. 9 is a sectional side elevation of the button injector mechanism in conjunction with the button chuck and work table.

FIG. 10 is a front elevation, partly in section, of the button chuck in open button receiving position.

FIG. 11 is also a front elevation illustrating the button chuck in closed position.

FIG. 12 is a sectional end elevation of the button chuck, taken on line 12—12 of FIG. 10.

FIG. 13 is a front elevation of the thread tensioning and snubbing mechanism.

FIG. 14 is a partial detailed front elevation of the mounting and adjusting mechanism for the thread tensioning device.

FIG. 15 is an end elevation taken on line 15—15 in FIG. 14.

FIG. 16 is an end elevation taken on line 16—16 of FIG. 13.

FIG. 17 is a detailed plan view of the thread tensioning finger.

FIG. 18 is a detailed plan view of the thread tensioning plate.

FIG. 19 is a front elevation of the thread tensioning arm during thread tensioning action, and FIG. 20 is an enlarged detailed plan view of the snubbing member during posting operations.

Figure 1:
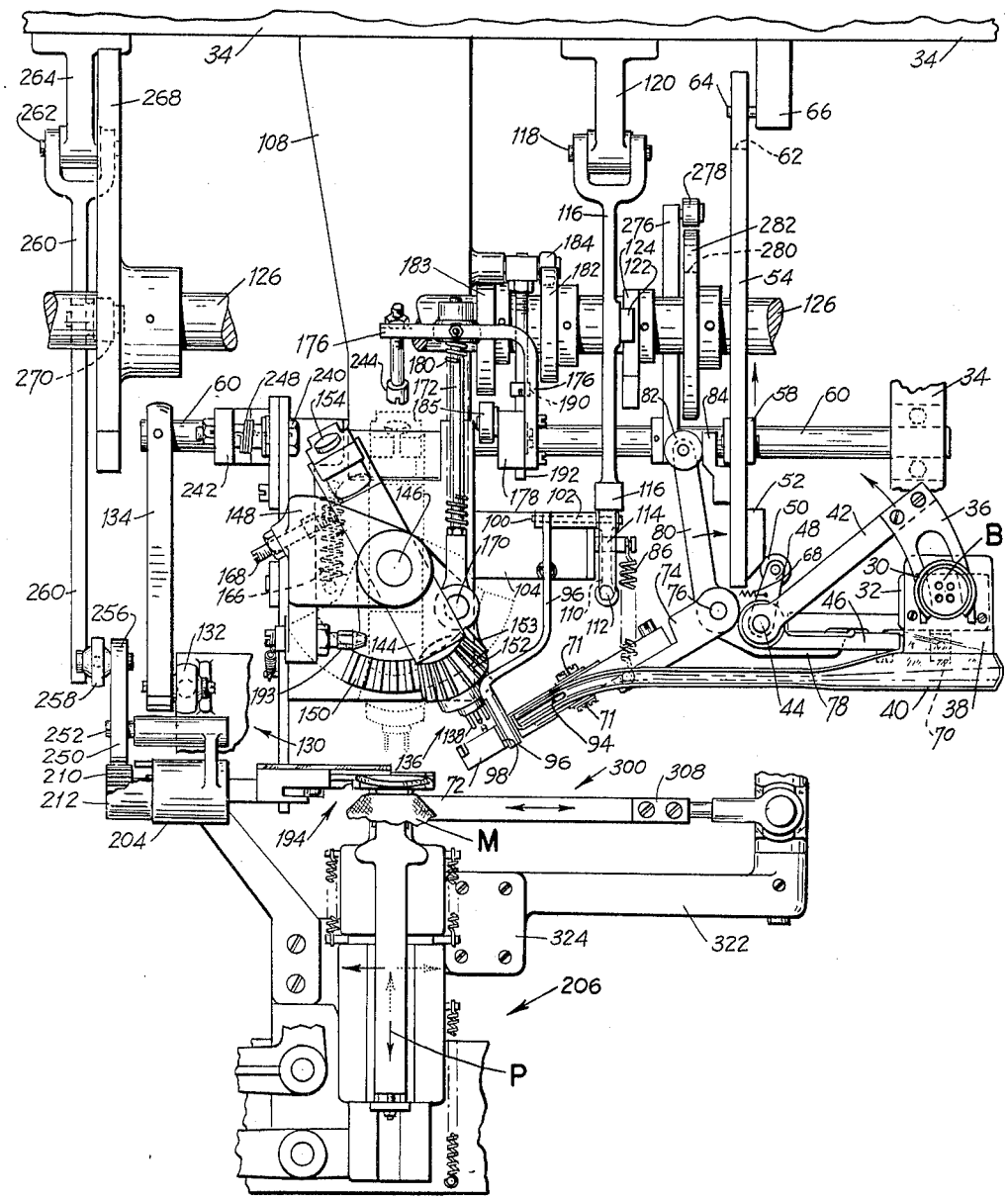
FIG. 1 is a plan view illustrating a preferred embodiment of the invention.

Referring to the drawings which illustrate a preferred embodiment of the invention incorporated in machines of the type referred to hereinabove, buttons B to be sewed to material M are stacked in a suitable receptacle or magazine 30 (FIGS. 1 and 2) secured to an upright bracket 32 mounted on a suitable portion of the framework 34 of the machine. In proper timed relation with and during each sewing cycle of the machine, one button is ejected from the stack by means of an oscillating suitably shaped ejector finger 36. This finger pushes the button on the bottom of the stack over bridge plate 38 into an inclined U-shaped chute 40. The term "cycle" as used herein means the complete course of operation of the sewing machine in attaching a button to the material, including "post" winding and securing the thread against unwinding.

Ejector finger 36 is secured to an actuating arm 42 mounted on the top end of vertical shaft 44 rotatably supported in bearing bracket 46 mounted on upright bracket 32. Secured to the lower end of vertical shaft 44 is a cam lever 48 carrying on its free end a cam roller 50 which engages a wedge-shaped cam piece 52 mounted on the side edge of a horizontal bar 54. Bar 54 is pivotally connected by stud 56 (FIG. 2) in the forked portion at the upper end of arm 58 mounted on horizontal shaft 60 rotatably supported by suitable bearings in the framework 34 of the machine. Bar 54 is maintained in its operative horizontal position by a forked portion 62 formed in its rear end (FIG. 2) which slidingly engages with a pin 64 projecting from and held by lug 66 suitably secured to the framework 34 of the machine. Tension spring 68 having one end secured to cam lever 48 and its other end fixed to a stationary pin maintains cam roller 50 in contact with cam piece 52 on bar 54.

The upper end of inclined U-shaped button delivery chute 40 is pivotally supported by a suitable bracket 70 secured to the upper portion of bracket 32. The lower end of shute 40 is provided with a pair of spaced depending clips 71 which loosely straddle or engage the top edge of a button trap 72 mounted on the free end of an oscillating arm 74 secured to a vertical shaft 76 rotatably supported by bearing bracket 78 mounted on bracket 32. Also secured to shaft 76 is a cam lever 80 carrying a cam roller 82 which engages with a suitably shaped cam lug 84 carried by horizontal bar 54. A suitable tension spring 86 is provided to keep cam roller 82 in constant contact with said cam lug 84.

Button trap 72, shown in detail in FIG. 3, is provided at its lowermost and extreme end, with an opening 88 of a suitable size to permit the ready removal of a button delivered thereto from chute 40. This particular end of the trap is also provided with suitable button positioning lugs 90 as well as with a yieldable button retaining finger 92. When a button is ejected from the stack of buttons in the magazine 30, it drops into and rolls down inclined chute 40, drops through slot 94 at the discharge end of chute 40 into the trap 72 where it comes to rest on button positioning lugs 90 and the retaining finger 92.

Figure 4:
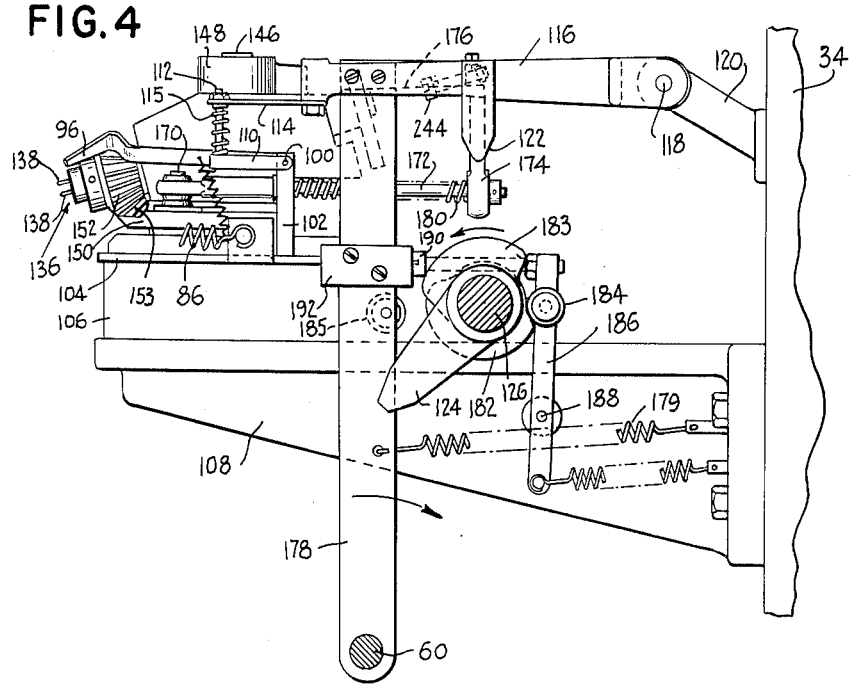
FIG. 4 is a side elevation, partly in section, illustrating the button injector and gate actuating mechanism.

In order to prevent jams and insure that only one button during each cycle may occupy the button delivery position in trap 72, the latter is provided with a gate finger 96, one end of which protrudes transversely through a notch 98 formed in the upper edge of the wall of trap 72, as illustrated in FIGS. 1, 2 and 3. The other end of gate finger 96 is secured to shaft 100 (FIGS. 1 and 4) rotatably supported in a suitable bracket 102 mounted on plate 104 secured to block 106, held by bracket 108, fastened to the framework 34 of the machine.

A lever 110 is secured to shaft 100. The free end of lever 110 carries an upwardly extending stud 112. The upper portion of stud 112 loosely engages with one end of a horizontal bar or leaf 114; the other end of leaf 114 is secured to the underside of the free end of an actuating lever 116 pivotally mounted on stud shaft 118 held by a bracket 120 secured to the framework 34 of the machine. A compression spring 115 encircling stud 112 provides a yieldable connection between leaf 114 and lever 110. A cam lug 122 secured to actuating lever 116 protrudes downwardly into the path of a rotating cam segment 124 mounted on cam shaft 126 rotatably supported in suitable bearings in the framework of the machine. The construction is such that during each revolution of cam shaft 126, which represents one cycle of the machine, cam segment 124 contacts and raises cam lug 122 and consequently gate actuating lever 116. The lifting of the lever 116 through the aforementioned connections effects a momentary lifting of the gate finger 96, and permits a waiting button in chute 40 to roll into trap 72.

Figure 7:
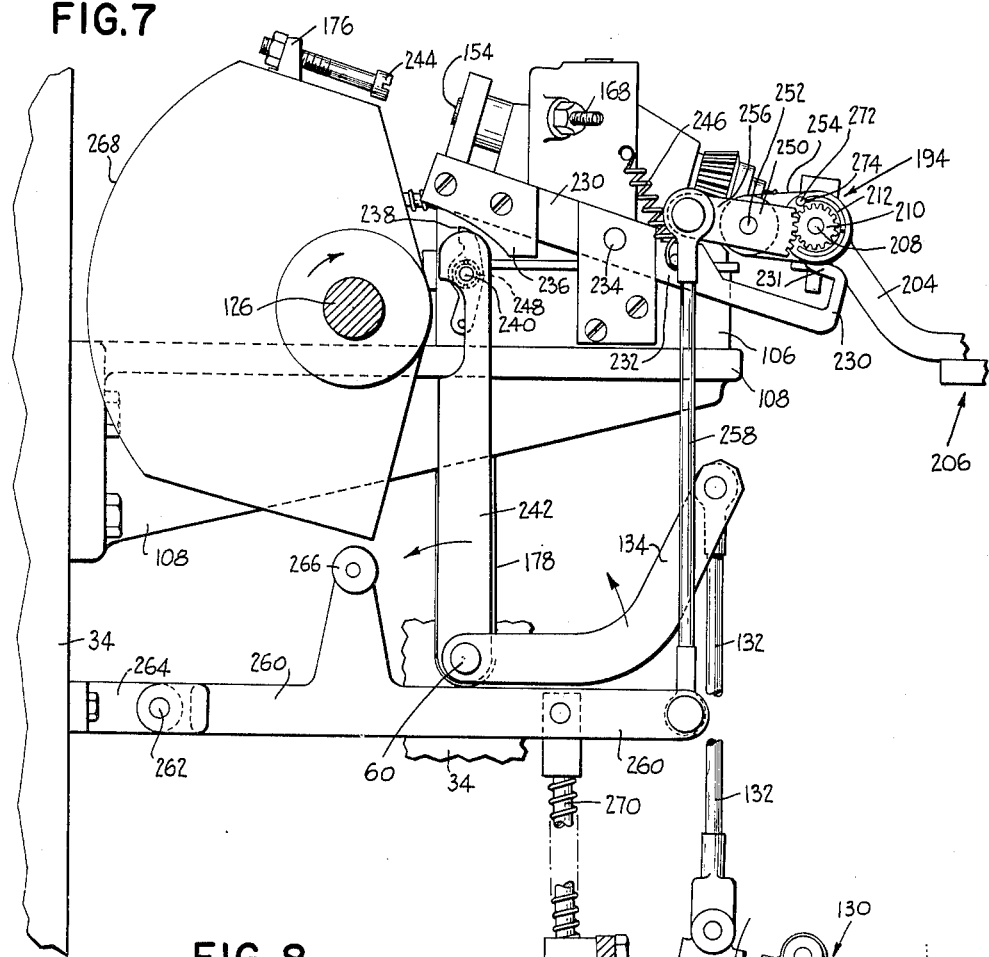
FIG. 7 is a side elevation of the button chuck opening, closing and turning mechanism.
Figure 8:
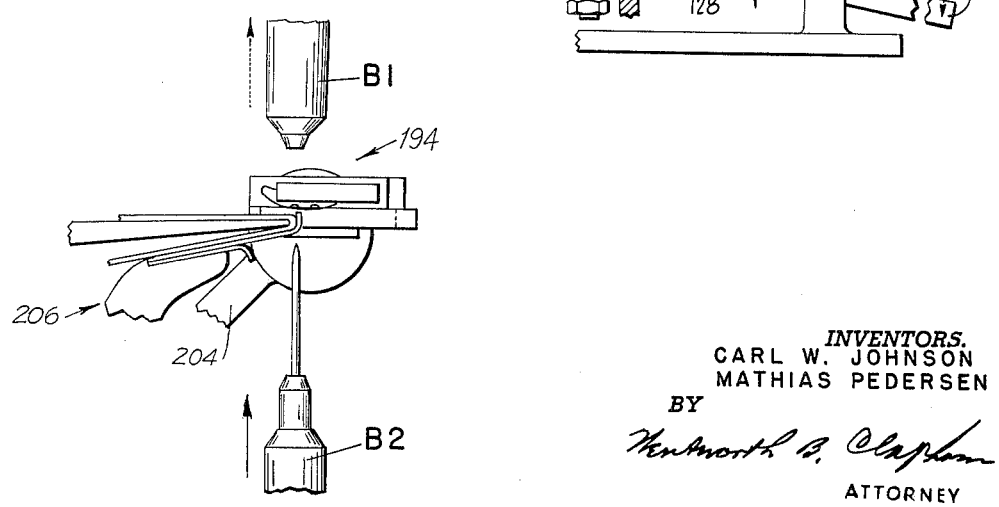
FIG. 8 is a partial side elevation illustrating the button chuck in horizontal button sewing position.

In order to extract the first button from trap 72 when starting button sewing operations say, for example three buttons are to be sewn to a man's suit coat, the operator presses the forward end 128 of a foot pedal 130 (FIGS. 1 and 7) downwardly in the direction of the arrow shown in FIG. 7. Since the rear end 128 of pedal 130 is connected by rod or link 132 to lever 134 mounted on horizontal shaft 60, the latter will turn in the direction of the arrow indicated in FIG. 2, and cause arm 58 to swing in a forward direction or to the left, as viewed in FIG. 2. Since the upper end of arm 58 is pivotally connected to horizontal bar 54, the latter also moves in the same direction as arm 58, which causes cam piece 52 to turn vertical shaft 44. As mentioned heretofore, shaft 44 represents the actuating means for the button ejector finger 36. When the forward portion 131 of treadle 130 is depressed by the operator, arm 58 swings in the opposite direction causing roller 82 to roll on the low portion of cam lug 84, and through cam lever 80 effects a clockwise rotation of the vertical shaft 76, as viewed in FIGURE 1.

Since trap 72 is secured to arm 74 on shaft 76, it will swing in a clockwise direction as viewed in FIGURE 1 towards injector 136. Therefore when the foot pedal 130 is depressed in this manner, trap 72 swings towards the transfer and injector 136 where the face of the button held in trap 72 contacts four button supporting and clamping pins 138 which project from the injector and rotate therewith. The rotation of the injector is caused by other mechanisms which will be described hereinafter. Since tension spring 86 presses the face of the button against the pins 138 extending outwardly from the rotating injector head 136, this rotation of injector 136 results in pins 138 becoming aligned with the holes of the button, whereupon pins 138 move into and through the button holes. Hooks 140 (FIG. 9) or burrs on the two of the pins prevent the button from being released from injector 136 when foot pedal 130 is released and trap 72 moves away from the injector 136 to resume its normal position.

Button transfer and injector 136 (FIGS. 1 and 9) comprises a slightly inclined horizontal shaft 142 rotatably mounted in bushings in a supporting member 144 pivotally held by a pair of vertical stud shafts 146 secured in a U-shaped bracket 148 mounted on the plate 104 and block 106. Within U-shaped bracket 148 and beneath member 144 and also pivotally held by lower stud shaft 146 is rotatably mounted a bevel gear segment 150 meshing with a bevel gear 152 secured to the forward end of inclined ejector shaft 142. As shown in FIG. 9, button carrier pins 138 are mounted in the forward end of shaft 142. Shaft 142 also is provided with a stepped down portion 154 to the end of which is secured an aligning lug 156 and a guide sleeve 158 slidably and rotatably engaging bore 160 in member 144. Within the bore 160 and surrounding stepped down portion 154 of shaft 142 and confined between a stationary bushing 162 and the sleeve 158, is a compression spring 164. The injector carrying member 144 also is provided with a tension spring 166 having its ends anchored to member 144 and to U-shaped bracket 148 which is employed for the purpose of keeping injector 136 normally aligned with the button trap 72 except when moved at the will of the operator or the actuating means of the machine, as described hereinafter. In order to insure an exact alignment of the injector 136 with the trap 72, an adjustable stop screw 168 is provided. Screw 168 is mounted in bracket 144.

Gear segment 150 (FIGS. 1, 4, and 9) carries a vertical stud 170 to which is pivotally connected one end of a suitable connecting rod 172. The other end of rod 172 loosely engages in a bore in a vertical lug 174 secured to one leg of an L-shaped horizontal member 176. The other leg of L-shaped member 176 is secured to the upper free end of a lever 178 mounted on the horizontal shaft 60. A suitable compression spring 180 encircles connecting rod 172 and is confined between the connecting rod head and vertical lug 174 in order to form a yieldable connection between gear segment 150 and its actuating member 178.

As mentioned hereinabove rocking of shaft 60 which effects the oscillation of gear segment 150 can be caused by manipulation of treadle 130. However, it is desirable to bring a new button to the button sewing station automatically after the completion of a preceding stitching cycle. In order to do this cam shaft 126 carries a cam 182 (FIGS. 1 and 4) which engages with a cam roller 184 pivotally mounted on a cam lever 186 loosely mounted on a stud shaft 188 held by a suitable lug of bracket 108. Secured to the upper free end of cam lever 186 is an adjustable stud 190 which during the forward motion of cam lever 186, to the left as viewed in FIG. 4, engages with a lug 192 carried by and mounted on the lever 178 so that said forward motion through lever 178, member 176, lug 174 and spring 180 is transmitted to connecting rod 172 which in turn causes the segment to turn in a clockwise direction, as viewed in FIG. 1. As gear segment 150 starts to turn clockwise bevel gear 152 also rotates until its rotation is arrested by the last right side end tooth 153 of gear segment 150. A continued clockwise rotation of gear segment 150 then forces bevel gear 152 and its supporting member 144 to move with segment 152 until member 144 is arrested by a suitable stop screw 193 at which point the button carrying injector 136 is in front of and aligned with button chuck 194 as shown in dotted lines in FIG. 1 ready to receive the button preparatory to commencing sewing operations.

As soon as the button is delivered into button chuck 194, cam roller 184 on cam lever 186 moves onto the high portion of the cam track of cam 182, and thus disengages stud 190 from the lug 192 of lever 178. Due to a tension spring 179 acting upon arm 178, the latter moves backwardly thereby causing bevel gear segment 150 to reverse its movement which in turn, due to the action of tension spring 166 upon injector head supporting member 144, permits the latter also to reverse its movement with gear segment 150 with the bevel gear 152 running over segment 150 until injector head supporting member 144 is arrested by means of stop screw 168, as illustrated in FIG. 1. Lever 178, however, cannot follow retreating stud 190 to its backmost position since at that moment a cam 183 moves in the path of rearwardly moving lever 178. Cam 183 serves as a movable stop for lever 178. When roller 185 on lever 178 engages the high portion of cam 183, further rearward movement thereof is presented, and bevel gear segment 150 is arrested in the position shown in FIG. 1. Segment 150 remains in this position until cam 183 disengages from and moves out of the path of lever 178, permitting the latter to be pulled back farther by tension spring 179 until lever 178 contacts and is arrested by stud 190 projecting from the now dwelling cam lever 186. This additional backward movement of lever 178 causes bevel gear segment 150 to continue its reverse rotation which, since injector 136 supporting member 144 is arrested, effects a reverse rotation of bevel gear 152 and consequently of injector 136.

This rearward swing of lever 178 through shaft 60 also effects a rearward swing of arm 58 which in turn causes a similar movement of horizontal bar 54. This movement of bar 54 causes cam roller 82 on lever 80 to roll onto the lower portion of cam lug 84 carried by bar 54, thus effecting a clockwise rotation of the vertical shaft 76, as viewed in FIG. 1. Since trap 72 is mounted on arm 74 secured to shaft 76, the trap 72 carrying a button B will swing towards and contact the now rotating injector 136. As described hereinabove the button is delivered onto pins 138 of injector 136.

As soon as lug 192 contacts stud 190 of cam lever 186, cam roller 184 thereon rolls onto the low portion of cam 182 and thus imparts forward motion to the lever 178. The forward motion of the latter, as viewed in FIG. 1, causes bevel gear segment 150 to rotate clockwise, which in turn causes clockwise rotation of bevel gear 152 and consequently of the injector 136 until the right hand last tooth of the bevel gear segment 150 engages with said bevel gear 152. During this clockwise and counter-clockwise rotation of injector 136, the pins 138 carried thereby rotate over the face of the button in the trap 72 until they locate and enter the holes of said button. The pressure of the tension spring 86 acting upon trap 72, causes the button to slide over said pins 138 and lodge thereon.

Button chuck 194 (FIGS. 1, 5, 6, 7, 8 and 9) in the embodiment selected to illustrate the invention, comprises two suitably shaped opposed jaws 196 and 198 slidably supported in a housing or member 200 which in turn is secured to swivel head 202 rotatably mounted in a suitable bearing bracket 204 secured to the material carrying work supporting table designated generally 206. Swivel head 202 at one end is provided with a stud shaft 208 to which is secured a gear 210 and also a housing 212 partially surrounding gear 210.

Within housing 200 pivotally mounted on stud 214, but partly projecting therefrom, is an L-shaped jaw actuating lever 216 which carries two pins 218 and 220. Pin 218 engages with a notch 222 provided in the jaw 198, and pin 220 engages with a notch 224 provided in the jaw 196. The upper portion of the vertical leg of the L-shaped lever 216 is in constant engagement with the end of a spring urged plunger 226 confined within a suitable bore within swivel head 202, and provided with a compression spring 228 (FIG. 10) to keep jaws 196 and 198 closed at all times except when the operator depresses the forward position of foot pedal 130 to effect the delivery of a new button from pins 138 into the jaws before beginning the sewing cycle.

The horizontal leg of the L-shaped jaw actuating lever 216 projects into the hook of U-shaped end 230 on one end of a double arm 232 lever pivotally mounted on stud 234 at its center portion. The other end of lever 232 carries a cam piece 236, the lower edge of which projects into the path of a suitably shaped spring mounted pawl or finger 238 pivotally mounted on a stud 240 carried by the upper free end of arm 242 mounted on the horizontal shaft 60 (FIG. 7). A forward movement of arm 242 caused by the rocking of shaft 60 effected by movement of treadle 130 causes finger 238 to engage the lower edge of cam piece 236 and effect a lifting of the rear portion of the double arm 232 while the hook-shaped portion 230 of the latter will move downward. This downward motion of front portion 230 enables hook 231 to engage and depress the horizontal leg of the L-shaped lever 216, thereby causing it to rock counterclockwise on stud 214 and effect the opening of jaws 196 and 198.

Figure 5:
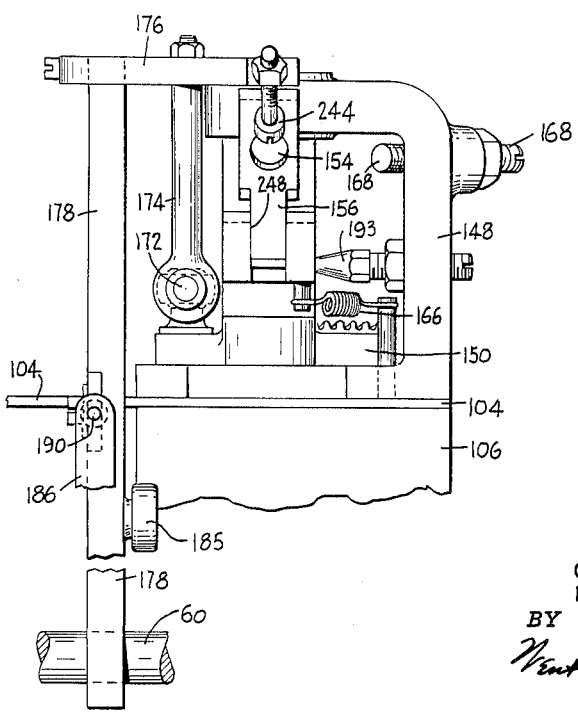
FIG. 5 is a rear view of the button injector mechanism.
Figure 6:
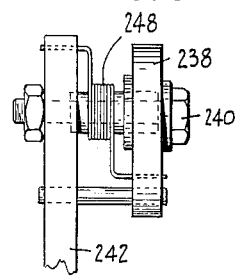
FIG. 6 is a partial detailed rear view of the button chuck opening and closing mechanism.

At the same time that the rocking of shaft 60 effects a forward swing of arm 242, as viewed in FIGS. 5 and 7, lever 178 carrying L-shaped member 176 also moves forwardly so that an adjustably mounted stud 244 carried by and projecting from member 176 contacts the rear end of the stepped down portion 154 of the injector shaft 142. This action moves injector 136 to the left as viewed in FIG. 6, so that pins 138 with a button supported thereon are positioned between the now open jaws 196 and 198 which close suddenly when at this point the spring mounted finger or pawl 238 drops off of the forward edge of cam piece 236 due to the action of a tension spring 246 (FIG. 5) upon double arm 232. Due to torque spring 248 (FIG. 11) surrounding pawl carrying stud 240 and acting upon pawl 238, the latter during the backward swing of arm 242 simply rides beneath cam piece 236 without effecting any upward pressure against arm 232. Since lever 178 which carries member 176 and stud 244 moves also backwards, compression spring 164 acting upon the injector shaft 142, also moves backwards and thus disengages its pins 138 from the holes in the button which is now firmly held in closed jaws 196 and 198 of button chuck 194.

When injector shaft 142 is pushed forwardly by means of stud 154 to inject a button into button chuck 194 aligning lug 156 engages an aligning groove or slot 248 formed in rear portion of member 144. This aligning means is provided in order to insure that each button delivered to button chuck 194 will have its holes properly oriented for the subsequent stitching operations. The sewing operation is the same or similar to the one shown and described in Patterson et al. Patent 2,739,550, and also referred to in our patents above referred to. The button, after the first tack stitch, is turned from its vertical position to a horizontal position for sewing operation and is then turned vertical again to effect posting.

The turning of button chuck 194 is achieved by means of an oscillating gear segment 250 which engages with the gear 210 on the swivel head shaft 208 and is pivotally mounted on a stud 252 held by a lug 254 integral with bracket 204. Gear segment 250 is provided with an extension 256 which is connected by a suitable connecting rod 258 to the free end of a cam lever 260. Cam lever 260 is pivotally mounted on a stud 262 held by a bracket 264 secured to the framework 34 of the machine. Cam lever 260 carries a cam roller 266 which in proper timed relation engages with a cam 268 mounted on cam shaft 126.

Cam lever 260 which is supported by a spring post 270 is only actuated when the cam roller 266 engages with the cam sector 268 during sewing operation. During posting operation and vertical holding of the button, the position of the button chuck 194 is controlled by a pin 272 (FIG. 7) projecting from bearing bracket 204 and engaging with the top edge 274 of a suitable cut-out of the partial gear housing 212.

Referring to FIGS. 10 and 11, it will be seen that housing 200 is adjustably slidably mounted in groove 203 in swivel head 202. Its adjusted position is maintained therein by set screw 205. This adjustment constitutes a preferred form of adjusting mechanism, which makes it possible to adjust the position of jaws 196 and 198 relative to the axis of rotation of shaft 208 so that regardless of the thickness of the button or the material to which it is to be attached, the spacing of the button relative to the work both during attaching and "post" winding operations will be a predetermined distance.

In order to prevent damage to the machine by accidentally depressing the foot pedal during operation, the horizontal shaft 60 is provided with a safety lever 276 (FIGS. 1 and 2) which on its free end carries a roller 278. Lever 276 can only swing forward when said roller 278 is in alignment with a suitable notch 280 in a disc 282 which is mounted on and rotates with the cam shaft 126.

As disclosed in the Patterson et al. patent and also in our patents above referred to, the cycle of stitching a button to the material comprises the formation of a plurality of attaching loops of thread connecting the button to the material while the button is held in jaws 196, 198 above the material in a substantially horizontal plane.

Upon completion of the formation of loops of thread attaching the button to the material, the button chuck is rotated by shaft 208 through 90° to locate the button in the position disclosed in FIG. 20. While the button is thus held in jaws 196, 198, needle N is moved back and forth along opposite sides of the loops of thread connecting the button to the material in order to form the desired "post" wrapping and by suitable cam means (not shown) which control the path of travel of the work support table 206 relative to the path of travel of the needle at the desired time the needle is moved back and forth through the loops of thread above referred to and the "post" wrapping to lock stitch the thread against unwinding at the conclusion of the sewing cycle.

The specific construction of the needle bars, the thread pullers, the thread receiving guides and their operating means are the same as disclosed in our copending application above referred to. Since they do not constitute a specific part of this invention a detailed showing and description are deemed unnecessary.

In order to maintain the thread in proper position without undue tension against the loops of thread which connect the button to the material during the post wrapping operations, there is provided a snubber which comprises an elongated reciprocating member, designated generally 300, having at its free end a pair of spaced fingers 302 and 304. These fingers are adapted to straddle the loops of thread which connect the button to the material so that during the reciprocatory movement of member 300, first finger 302 and then finger 304 is moved into engagement with opposite sides of the loops of thread.

FIG. 20 discloses a typical operative movement of snubber member 300 wherein finger 302 is in engagement with and is holding a portion of the winding thread against the loop of thread connecting the button to the material. Upon the next movement of needle N in the opposite direction along the opposite side of the loops of thread to dispose the winding thread adjacent thereto, finger 304 is moved into engagement with this portion of the winding thread. Referring to FIG. 13, needle N has been transferred by upper needle bar B1 to lower needle bar B2 which is in the process of being moved upwardly by mechanism similar to that disclosed in our Patent 3,121,411 or in the Patterson et al. patent above referred to. At this same time, finger 302 is in thread snubbing position or that position indicated in FIG. 20.

The other end of snubber member 300 is held fast in an adjustable clamp fork 308 connected to one arm 310 of a bell crank lever 312, the other arm 314 of which is connected to an adjustable connecting rod 316 in turn connected to a lever 318 having one end pivotally mounted on stud shaft 320 supported in the frame of the machine. Adjustable clamp fork 308 makes it possible to adjust the portion of fingers 302, 304 relative to the path of travel of needle N. Bell crank lever 312 is swingably mounted on a pivot stud 313 supported in a bearing bracket 322 mounted on the frame 324 of table 206.

As shown in FIG. 13, the portion of lever 318 adjacent its pivotal support 320 is adapted to move up and down in a slot 326 formed in one arm 327 of a compound lever 328 also pivotally mounted on stud shaft 320. A spring 330 having one end secured to a pin 332 mounted in arm 327 has its other end attached to a pin 334 fixed in the frame of the machine. This spring maintains cam follower 336 carried by arm 338 of lever 328 in engagement with cam 340 fixed to and rotating with shaft 342. Secured to an extension 344 forming a part of arm 327 of lever 328 is a pin 346 which passes upwardly through a clearance hole in lever 318. Pin 346 is provided at its free end with a head 348 engaging the upper surface of lever 318. Encircling pin 346 and bearing against the under surface of lever 318 and the upper face of extension 344 is a compression spring 350 which provides a lost motion connection between levers 318 and 328 for a purpose described hereinafter. The compressive force of spring 350 is such that under normal operating conditions when snubbing device 300 is in operation, levers 318 and 328 operate as a single cam lever in effecting the necessary reciprocation of fingers 302 and 304 in carrying out their snubbing functions in response to the rotation of cam 340.

The machine is provided with a pair of thread grippers 356 adjacent the lower needle bar which are constructed and operate in the manner disclosed and described in Johnson Patent 2,368,066. Since they form no specific part of the invention further description and showing are omitted in the interest of brevity. Grippers 356 grip a loop of the thread adjacent lower needle bar B2 before the needle is moved upwardly thereby, and delivered to needle bar B1.

Substantially simultaneously with the gripping of the thread by gripper jaws 356, a tension finger 352 slidably supported in bearing 358 on the machine frame, and having a thread engaging hook 354, is moved into engagement with the thread adjacent gripper jaws 356. Hook 354 pulls the thread tight against the post and thereby controls the tension of the thread which is disposed around the loops connecting the button to the material in the formation of the post. Tension finger 352 operates in the manner described just prior to every upward movement of the needle by needle bar B2 to needle bar B1 during the "post" forming operations.

Tension finger 352 comprises an elongated rod 353 having a hook 354 at its free end. Rod 353 is supported for reciprocatory movement in bearing 358 attached to the machine frame. It is provided with a lug 360 having a tongue 362 which engages a slot 364 in bracket 366 fastened to the machine frame. This construction maintains tension finger 352 at all times in a fixed operative position. See FIG. 13.

The end of rod 353 near lug 360 is supported in a slotted bearing 368 attached to bracket 366. Lug 360 serves as a spring post for one end of an actuating spring 370, the other end of which is attached to spring post 372 in bearing 368. Tension finger 352 is moved to the left, as viewed in FIG. 13, by cam 374, and a cam follower 376 mounted on lever 378 pivoted at 380. The other end of lever 378 engages a transverse pin 382 fixed suitably to bar 353. Reference to FIG. 13 shows that as cam follower 376 moves onto the low portion of cam 374, the free or upper end of lever 378 moves away from pin 382 so that spring 370 can actuate tension finger 352 to cause hook 354 thereof to engage the thread extending between the "post" being formed and gripper jaws 356 and tension it.

As mentioned hereinabove, snubber device 300 and tension finger 352 are operated only during the "post" forming operations. Therefore, mechanism is provided for incapacitating them during the formation of stitches attaching a button to the material. Referring to FIGS. 13, 14 and 16, there is provided a lever 384 pivotally mounted in bracket 386 fixed to the machine frame. As indicated in FIG. 16, one arm of lever 384 is connected to one end of lockout member 388 slidably supported in bracket 390 on the machine frame. The other end of member 388 is provided with a slotted portion 392 through which tension rod 353 may pass during its normal described operation. However, during the lockout phase of tension finger 352, a suitable cam 394 on shaft 126 engaged by a cam follower 396 on lever 384 causes lever 384 to rock in a clockwise direction, as viewed in FIG. 16, whereupon shoulder 398 of slotted portion 392 is positioned in the path of travel of tension finger 352 and obstructs its movement, until such time as the machine is ready to form a "post."

The other arm of lever 384 is connected to a lockout member 400 slidably mounted in bracket 402. At the time when lockout member 400 becomes operative, cam 340 (FIG. 13) has located lever 318 in such position that slot 404, formed in its free end, is disposed in alignment with nose 406 formed on the end of lockout member 400, and the rotation of cam 394 tracked by follower 396 causes nose 406 to move into engagement with slot 404 and thereby incapacitate snubber device 300 through the lost motion construction above described.

Mounted beneath the work support table 206, and arranged to coact with lower needle bar B2 is a relatively stationary thread tensioning plate 408. See FIGS. 18 and 19. As shown in detail in FIG. 18, this plate at its free end is formed a semi-circular portion having a tapered under-face adapted to coact with tapered portion 410 of lower needle bar B2. Tension plate 409 is operative on the upstroke of lower needle bar B2 to engage and exert a controlled amount of tension on the loose end of the thread thereby preventing whipping or snapping about of the thread as it is being pulled by upper thread puller 41 from lower thread supporting guide G2 and disposed in upper thread guide G1.

The opposite end of tension plate 408 is attached to a block 412 which has formed integrally therewith a stud shaft 414 extending through a bearing formed in bracket 366. A collar 416 fixed to shaft 414 positions block 412 operatively in bracket 366. The end of tension plate 408 adjacent block 412 is engaged by an adjustable set screw block 412. The end of plate 408 supported thereon, a spacer plate 418 and an elongated flat spring 420 constitute a rockable assembly held together by screws 422 which make it possible to adjust the vertical movements of tension plate 408 between closely determined vertical limits.

The right hand end of plate 408, as viewed in FIG. 14, engages a stop screw 424 threadably supported in bracket 366. This screw is used to maintain the free end of plate 408 in proper operative position with respect to needle bar B2 (see FIG. 13). An adjustable set screw 426 carried by an extension of bracket 366 is operable to control the amount of tension imposed on the thread by plate 408. A lock spring 428 attached to bracket 366 has a portion engaging lock nut 430 on set screw 426 in order to prevent the adjusting screw getting out of adjustment as the result of the vibration of the machine.

Referring to FIG. 1, it will be seen that the invention described hereinabove constitutes a closely integrated system of mechanisms for feeding, transferring and delivering buttons into a button chuck and for effecting the proper and rapid attachment of each button to material M in a novel and expeditious manner. The material supporting table 206, button chuck 194, and snubber 300 are all mounted on a common movable support which insures that in the course of the attachment of a button to material M and also the post winding operations incident to the completion of the sewing cycle, these parts will have a common movable support by means of which the necessary movements thereof can be carried out in the course of operation of the machine. As indicated hereinabove, the specific mechanism for moving the button and material M into and out of the path of the needle N may be similar to that described in the referred to Patterson et al. patent, and detailed description and disclosure thereof are not set forth in the above description or shown in the drawings. The broken-line pattern in FIG. 1, indicated at P, illustrate generally the path of travel of the common support above referred to during the stitching cycle of the machine.

What we claim is:

1. In a button sewing machine having a work supporting table, a button chuck, a common movable support for said table and said chuck, said support being adapted to dispose said table with material supported thereon and said chuck holding a button in the path of travel of a needle threaded with a thread having a loose and a fixed end, and a pair of opposed alternately operated needle bars adapted to pass said needle back and forth through selected holes in said button and said material, and said button only in accordance with a predetermined stitching and thread winding pattern, and means for pulling said loose end of said thread through said material and said button, the combination with means for positioning said chuck in a button receiving position, a source of supply of buttons, a rotatably mounted button ejecting device, means for delivering a button to said ejecting device at said source of supply, a discharge station, means for rotating said device to deliver said button to said discharge station, and means operative at said discharge station for actuating said device to inject a button into said chuck.

2. The invention defined in claim 1, wherein said chuck comprises button holding jaws and said positioning means includes means for positioning said chuck with a button held therein for attachment of said button to said material, and means for adjusting the position of said jaws of said chuck relative to said material supported on said table so that the distance between the under surface of a button and the top of said material to which it is to be attached can be adjusted to a predetermined distance.

3. A button chuck for a button sewing machine comprising a movable support, a swivel head rotatably mounted in said support, a jaw supporting member carried by said swivel head, a pair of opposed gripper jaws slidably mounted in said member, resilient means normally maintaining said jaws in closed position, means for rotating said member to dispose said jaws in a plurality of predetermined operating positions, including a button receiving position, means for opening said jaws when said jaws are disposed in said receiving position, and means operative in response to the delivery of a button between said jaws for automatically closing them to hold a button therebetween.

4. The button chuck defined in claim 3 wherein said means for opening said jaws includes a lever mounted on said member, spaced actuating pins mounted on said lever, one of said pins engaging a recess in one of said jaws and another of said pins engaging a recess in the other of said jaws, said resilient means comprising a spring pressed rod bearing against said lever, a manually operated lever engaging said first-named lever for overcoming the pressure of said resilient means to open said jaws, said last-named lever having a finger operative in response to continued manual operation of said last-named lever to move off the end of said first-named lever upon delivery of a button between said jaws, whereby said resilient means again close said jaws upon the button.

5. A button chuck for a button sewing machine comprising a movable support, a swivel head rotatably mounted in said support, a jaw supporting member, means detachably mounting said member on said swivel head, a pair of opposed gripper jaws slidably mounted in said member, resilient means normally maintaining said jaws in closed position, means for rotating said member to dispose said jaws in a plurality of predetermined operating positions, including a button receiving position, means for opening said jaws when said jaws are disposed in said receiving position, means operative in response to the delivery of a button between said jaws for automatically closing them to hold a button therebetween, a movable mount for said jaws, and means securing said mount in an adjusted position in said swivel head.

References Cited by the Examiner
UNITED STATES PATENTS
2,158,171   5/1939   Avis _____ 112—110

JORDAN FRANKLIN, *Primary Examiner.*

G. V. LARKIN, *Assistant Examiner.*